(12) United States Patent
Pruett et al.

(10) Patent No.: US 8,506,821 B2
(45) Date of Patent: Aug. 13, 2013

(54) DEWATERING SYSTEM

(75) Inventors: John O. Pruett, Houston, TX (US);
Gary E. Fout, Cypress, TX (US)

(73) Assignee: M-I L.L.C., Houston, TX (US)

( * ) Notice: Subject to any disclaimer, the term of this patent is extended or adjusted under 35 U.S.C. 154(b) by 471 days.

(21) Appl. No.: 12/617,264

(22) Filed: Nov. 12, 2009

(65) Prior Publication Data

US 2010/0116753 A1   May 13, 2010

Related U.S. Application Data

(60) Provisional application No. 61/113,952, filed on Nov. 12, 2008.

(51) Int. Cl.
*B01D 17/04* (2006.01)
*B01D 21/00* (2006.01)
*C02F 1/00* (2006.01)
*C02F 1/52* (2006.01)
*C02F 1/38* (2006.01)
*B03D 3/00* (2006.01)

(52) U.S. Cl.
USPC ........... 210/710; 210/712; 210/708; 210/787; 210/729; 210/732

(58) Field of Classification Search
USPC .............. 210/710, 208, 202, 143, 195.1, 209, 210/257.1, 259, 708, 702, 729–732, 770, 210/787, 804, 519; 175/66, 206, 207
See application file for complete search history.

(56) References Cited

U.S. PATENT DOCUMENTS

| | | | | |
|---|---|---|---|---|
| 3,994,808 A * | 11/1976 | Kearney | ......................... | 366/348 |
| 5,013,454 A * | 5/1991 | Hynninen | ..................... | 210/718 |
| 5,093,008 A * | 3/1992 | Clifford, III. | ................. | 210/725 |
| 5,147,556 A * | 9/1992 | Taylor | ............................. | 210/712 |
| 5,814,230 A * | 9/1998 | Willis et al. | ................... | 210/710 |
| 6,863,809 B2 * | 3/2005 | Smith et al. | .................... | 210/202 |
| 2007/0045181 A1 * | 3/2007 | Brase | ............................ | 210/605 |
| 2007/0246431 A1 * | 10/2007 | Palmer | .......................... | 210/715 |

* cited by examiner

*Primary Examiner* — Bobby Ramdhanie
*Assistant Examiner* — Nader Hossaini
(74) *Attorney, Agent, or Firm* — Osha Liang LLP

(57) ABSTRACT

A system for processing drilling mud, the system including a primary separation tank having an inlet for receiving drilling waste and an outlet in fluid communication with a feed line, and an injection pump in fluid communication with a polymer tank and the feed line. The system also includes a clarifying tank in fluid communication with the feed line and a first collection tank, wherein effluent from the clarifying tank is discharged into the first collection tank, and a centrifuge in fluid communication with the clarifying tank and a second collection tank, wherein effluent from the centrifuge is discharged into the second collection tank.

14 Claims, 2 Drawing Sheets

DEWATERING SYSTEM

CROSS-REFERENCE TO RELATED APPLICATIONS

This Application claims the benefit of the following application under 35 U.S.C. 119(e); U.S. Provisional Application Ser. No. 61/113,952 filed on Nov. 12, 2008, incorporated by reference in its entirety herein.

BACKGROUND

1. Field of the Disclosure

Embodiments disclosed herein relate generally to systems and methods of dewatering return drilling mud at a drilling location. More specifically, embodiments disclosed here relate to systems and methods of dewatering return drilling mud, including a sand trap, at a drilling location.

2. Background Art

Generally, waste management dewatering systems separate solids and fine particles from the liquid phase of drilling fluid, thereby leaving a clarified aqueous solution. In a drilling operation, dewatering allows the cleaning of waste fluids, such as, drilling fluids including low gravity solids, chemicals, drill cuttings, and other waste products mixed with water from the rotary table, mud tanks, mud pumps, generators and from any other discharge point around a drilling rig. Typically, dewatering waste management systems clean drilling fluid through coagulation, flocculation, and/or mechanical separation.

Coagulation occurs when the electrostatic charge on a solid is reduced, destabilizing the solid and allowing it to be attracted to other solids by van der Waals forces. Flocculation is the binding of individual solid particles into aggregates of multiple particles. Flocculation is physical, rather than electrical, and occurs when one segment of a flocculating polymer chain absorbs simultaneously onto more than one particle. Mechanical separation includes mechanical devices (e.g., hydrocyclones and centrifuges) that remove solid particles from a solution.

Traditionally, methods for removing solids from solutions in the dewatering of drilling fluid included the replication of the natural mud flocculation mechanisms using either calcium or chlorine based ion contamination. Lime and various chloride sources (e.g., $AlCl_3$) were used for flocculation. The solid aggregates could then be separated out by gravity filtration and/or a mechanical device, as described above. However, with the introduction of non-dispersed, inhibitive water-based drilling fluids (e.g., partially-hydrolyzed polyacrylamide and KCl), the clay particles within a mud system were already conditioned to resist ion contamination (i.e., resistant to flocculation and/or aggregation). Thus, the dewatering of water-based drilling fluids requires multi-charge, high molecular weight polymers for flocculation.

Typically, polymers used for flocculation are manufactured in dry form and mixed by dewatering system operators into a solution prior to treating a mud system. Also, because the dry polymer is added to a liquid, an aging process is required to activate the dry polymers. Additionally, these polymers tend to be hygroscopic, and as such, have a limited shelf life. Thus, when housed in outdoor storage facilities, such as typically occurs in current commercial drilling operations, the hygroscopic polymers take on water from the environment, thereby decreasing their effective life. Also, the polymers in current commercial systems are typically exposed to wide temperature variations, further resulting in decreased effective life. Due to the need of polymer solution aging, batch mixing, and the limited shelf life in current commercial systems, management of dry flocculant dewatering systems is costly and resource dependent.

In response to the increased use of water-based drilling fluids, many companies now manufacture invert emulsion liquid flocculants and coagulants that provide increased activity and shelf life. However, due to their nanoemulsion formulation, these products require high energy for emulsion breaking and activation. Also, the liquid flocculants and coagulants still experience decreased shelf life when exposed to moisture and wide temperature variation. Thus, the liquid flocculants and coagulants do not always work effectively in current commercial systems.

Accordingly, there exists a need for systems and methods for dewatering used drilling mud at a drilling location.

SUMMARY OF THE DISCLOSURE

In one aspect, embodiments disclosed herein relate to a system for processing drilling mud, the system including a primary separation tank having an inlet for receiving drilling waste and an outlet in fluid communication with a feed line, and an injection pump in fluid communication with a polymer tank and the feed line. The system also includes a clarifying tank in fluid communication with the feed line and a first collection tank, wherein effluent from the clarifying tank is discharged into the first collection tank, and a centrifuge in fluid communication with the clarifying tank and a second collection tank, wherein effluent from the centrifuge is discharged into the second collection tank.

In another aspect, embodiments disclosed herein relate to a method of processing drilling waste including providing a flow of drilling waste from a primary separation device to a primary separation tank, removing coarse particulates from the drilling waste in the primary separation tank, and injecting a polymer into drilling mud removed from the primary separation tank. The method further includes transferring drilling mud to a clarifying tank, removing fine particulates from the clarifying tank, transferring an effluent from the clarifying tank to a collection tank, and transferring the fine particulates from the clarifying tank to a centrifuge. Additionally, the method includes removing additional fine particulates from the effluent with the centrifuge and transferring a second effluent from the centrifuge to a second collection tank.

Other aspects and advantages of the invention will be apparent from the following description and the appended claims.

DETAILED DESCRIPTION

In one aspect, embodiments disclosed herein relate generally to systems and methods of dewatering return drilling mud at a drilling location. More specifically, embodiments disclosed here relate to systems and methods of dewatering return drilling mud, including a sand trap, at a drilling location.

Dewatering refers to the removal of solids from a fluid, such that the removed fluids may be reused in various aspects of the drilling operation. Dewatering may be divided into two types of operations, a first operation, total dewatering, which refers to the removal of a maximum quantity of solids from a fluid, resulting in water that may be reused to build new fluids; and a second operation, partial dewatering, which refers to a process used to remove a majority of low gravity solids ("LGS") from a fluid, such that the fluid may be reused or disposed. Variations of the system disclosed herein may be used for both total and partial dewatering operations. After the fluid is dewatered, the produced fluid may be used for mixing and diluting polymer for other processes, building new fluids, and diluting high solid content fluids, among other uses.

Typically, as used drilling fluids return from down hole, drill cuttings and other fine particulate matter may be suspended therein. Initially, the used drilling fluid may undergo any number of separation techniques (e.g., centrifugation, screening, mud cleaners, and shaking) to remove large drill cuttings from the fluid. While the aforementioned methods may remove large drill cuttings, other solids and fine particulate matter may remain suspended in the drilling fluid. To further remove particulate matter, as described above, coagulation and/or flocculation may be used.

The dewatering process may begin by taking a sample of the fluid being processed and testing the fluid to determine pH, such that a correct level of coagulants, flocculants, and/or acid may be added to the fluid. Additional fluid characteristics that may be analyzed include density, plastic viscosity, yield point, salinity, solids content, and filtrate. Such a test may also be performed at the end of the dewatering process to determine the clarity of the product, as well as to determine whether modifications to components of the dewatering system, such as polymer injection rates, etc., need to be adjusted. These properties may be measured by any suitable technique known to those of skill in the art.

Figure 1:
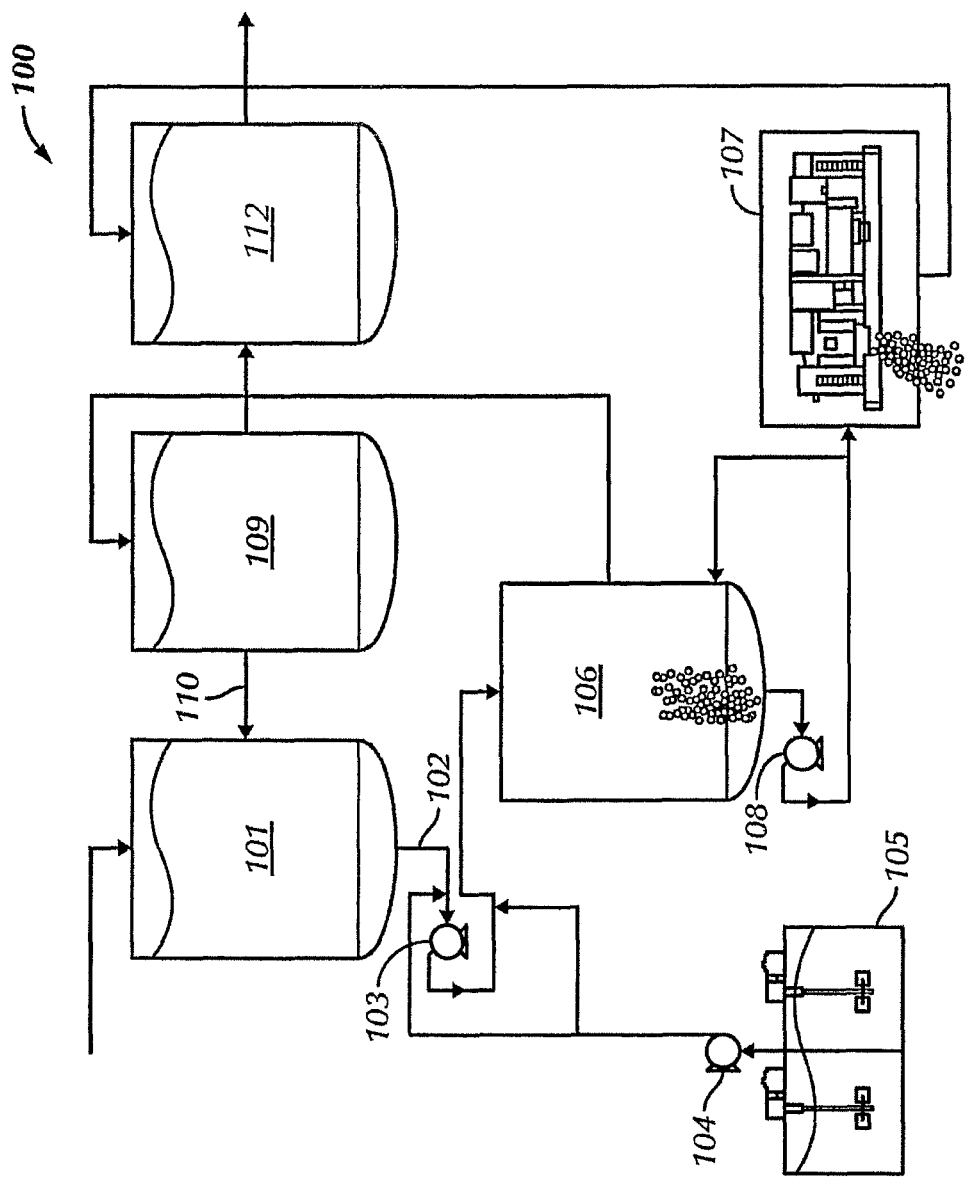
FIG. 1 is a schematic representation of a dewatering system according to embodiments of the present disclosure.

Referring to FIG. 1, a dewatering system 100 for processing drilling waste according to embodiments of the present disclosure is shown. In this embodiment, drilling waste, including cuttings and used drilling mud, is initially processed in a primary separation process. Primary separation may include, for example, one or more vibratory separators (not shown) that receive a return flow of drilling mud from a wellbore. The vibratory separators may include one or more screens having a mesh of a particular size. Thus, as the drilling mud flows over the vibratory separators, particulate matter of a size greater than the perforation size of the screens is separated from drilling mud, and the drilling mud is collected therefrom.

After primary separation, the drilling mud separated from large particulate matter is fed from the vibratory separators (not shown) into a sand trap 101. Sand trap 101, also known as a settling pit, includes a tank having sand and/or other fine particulate matter that may be used to trap coarse particulate matter in the fluid flow from the vibratory separators. The fluids from the drilling mud flow through at least a portion of the sand trap 101, and as the drilling mud flows through the sand, coarse particulate matter is retained in the sand, while the fluid portion of the drilling mud is discharged from the trap. Coarse particulate matter may include particles that inadvertently entered an underflow of the separators during primary separation, for example, as a result of failure of one or more components of the primary separation operation. Additionally, coarse particulate matter may inadvertently enter the flow of drilling mud from the primary separation operation, and as such, the sand trap 101 may provide a safety mechanism to prevent coarse particles from entering the rest of dewatering system 100. The coarse particulate matter may settle in the tank, and be removed by actuating, for example, a butterfly valve, at the base of the sand trap 101. Mud may either be pumped from the sand trap 101 or, in certain embodiments, mud may overflow through a cutout (i.e., gravity feed) in the sand trap 101 opposite the inlet point of the sand trap 101, and flow into a feed line 102.

Feed line 102 may be fluidly connected to an injection pump 103 configured to mix the mud with one or more polymers. As drilling mud flows from sand trap 101 into feed line 102, a polymer injection pump 104 may be used to inject polymer from a polymer feed tank 105 into feed line 102. As illustrated, polymer feed tank 105 is a dual tank system, however, those of ordinary skill in the art will appreciate that in other aspects, polymer feed tank 105 may include more than two tanks, or a single tank system.

Polymer injection pump 104 may thus provide a flow of polymer from polymer tank 105 directly into feed line 102. In other aspects, polymer injection pump 104 may provide a flow of polymer from polymer tank 105 to injection pump 103, rather than directly into feed line 102. Additionally, in certain aspects, polymer may include a dry polymer, and thus require mixing with water prior to injection into feed line 102. Examples of such methods of using polyductors to mix dry polymer for injection into a dewatering system are disclosed in U.S. patent application Ser. No. 11/461,969, now U.S. Pat. No. 7,736,497, filed Aug. 2, 2006, to the assignee of the present application, and is hereby incorporated by reference herein. Polymers that may be used in dewatering system 100 include flocculant and/or coagulant polymers, which may be in either dry or liquid form.

Injection pump 103, such as a progressive cavity injection pump, may include high flow nozzles for dispersing the polymer in the drilling mud. By substantially evenly dispersing the polymer in the drilling mud, fine particulate matter may begin to flocculate and fall out of the drilling mud. Thus, the separation of fine particulate matter from the fluid may begin in the feed line 102.

Figure 2:
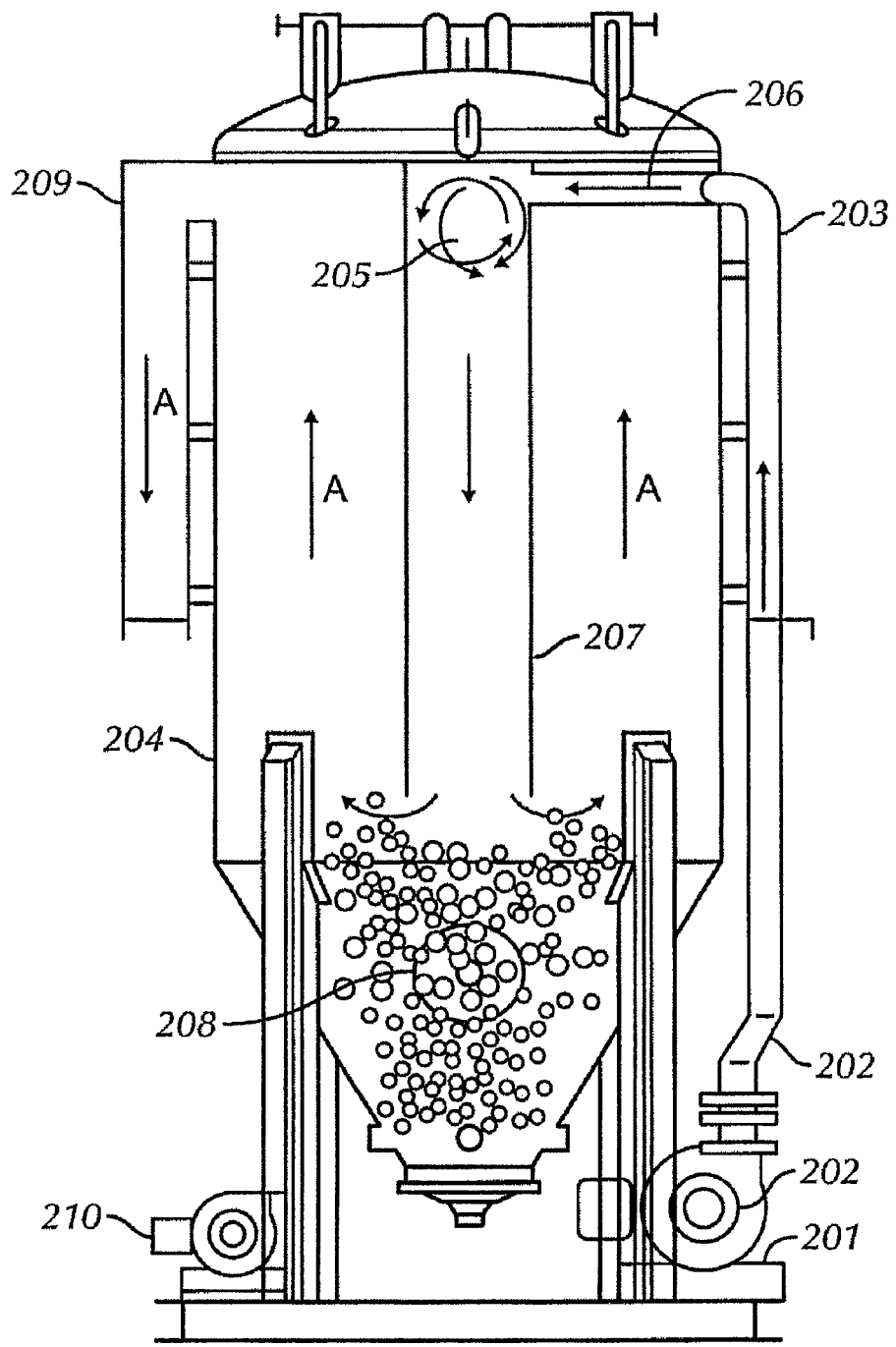
FIG. 2 is a schematic representation of a clarifying tank according to embodiments of the present disclosure.

After the polymer is injected into the drilling mud, the drilling mud is pumped into a clarification tank 106. Clarification tank 106 allows the fine particulate matter to drop out of the drilling mud, thereby further cleaning the drilling mud. Referring briefly to FIG. 2, a perspective view of a clarification tank 200 according to embodiments of the present disclosure is shown. Drilling mud from the feed line (102, FIG. 1) enters clarification tank 200 through a charge pump 201. Proximate or integral to charge pump 201 may be polymer injection ports 202 for injecting polymer into the drilling mud, similar as to the process described above. The drilling mud is then pumped through feed pipe 203 into the body 204 of clarification tank 200. Body 204 of clarification tank 200 includes a venturi zone 205. Venturi zone 205 may result as the drilling mud flows through constricted portion 206. In certain embodiments air may thus be injected into the drilling mud, thereby helping to separate fine particulate matter from the drilling mud. In other aspects, constricted portion 206 may result in turbulent flow through venturi zone 205, such that fine particulate matter falls out of the fluid.

As the drilling mud flows through internal pipe 207 from constricted portion 206, fine particulate matter may continue to drop out of the drilling mud and fall into settling zone 208. As the fine particulate matters begins to settle, an effluent portion of the drilling mud continues to flow up the outside of internal pipe 207 to discharge port 209, along flowpath A. The effluent then enters a collection tank, while the settled fine particulate matter is pumped to a centrifuge (not shown).

Referring back to FIG. 1, effluent from the clarification tank 106 is discharged into collection tank 109. In certain embodiments, an additional pump may be used to facilitate the transference of effluent from clarification tank 106 to collection tank 109. In certain aspects, collection tank 109 may include additional separation devices, such as skimmers, hydrocarbon removal devices, or a weir device configured to further separate fine particulate matter from the effluent. In other embodiments, collection tank 109 may be used to hold effluent prior to reinjection into the active mud system, or use for another operation at the drilling site. As illustrated, collection tank 109 also includes a back flow 110 in fluid communication with an inlet of sand trap 101, which allows excess effluent to be used to dilute drilling mud, or to prevent collection tank 109 from overflowing during a period of high effluent production rate.

The fines from clarification tank 106 are pumped into a centrifuge 107 by centrifuge pump 108. Centrifuge pump 108 may include a centrifugal or progressive cavity pump controlled by a variable frequency drive, and may be capable of pumping the fines and residual fluid at a rate of 80 to 200 gallons per minute. In certain embodiments, the centrifuge pump 108 may further include pumps capable of providing 100 gallons per minute of fines from the clarification tank 106 to an elevated centrifuge 107. During the flow of fluid between the tank 106 and the centrifuge 107 through the flow line, the fluid may be treated with additional polymer.

Centrifuge pump 108 thus provides a flow of fines and residual effluent to centrifuge 107 at a rate as desired by an operator or required by the dewatering system 100. Centrifuge 107 may be used to remove additional fine particulate matter from the fluid, such as the particulate matter that was not removed in clarification tank 106. The separated fine particulate matter from centrifuge 107 may be collected, and the effluent produced therefrom may be routed to a second collection tank 118. In certain embodiments the flow of effluent from centrifuge 107 to second collection tank 118 may occur at a rate of about 40 to 100 gallons per minute. Second collection tank 118 may be used to collect effluent for later use in either the active drilling system, or for other operations at the drilling location.

In certain aspects, second collection tank 118 may include additional separation devices, such as skimmers, hydrocarbon removal devices, or a weir device configured to further separate fine particulate matter from the effluent. Additionally, second collection tank 118 may be in fluid communication with collection tank 109, thereby allowing overflow from collection tank 109 to enter second collection tank 118, or allowing overflow from second collection tank 118 to enter collection tank 109. As effluent is needed for various aspects of the drilling operation, effluent may be pumped, for example at a rate of 800 gallons per minute, from collection tank 109 or second collection tank 118 into the active drilling mud system.

In certain aspects, the effluent collected in the first and/or second collection tanks may be recycled into the system and used to dilute the drilling mud, or in other aspects, the effluent may be used during polymer injection if the polymer is, for example, a dry flocculant. In still other embodiments, the effluent may be used in other aspects of the drilling operation, such as in forming drilling fluids or diluting high solids content fluids.

Dewatering systems and the methods of controlling such systems disclosed herein may allow for a self-contained and automated system capable of processing wastewater or used drilling fluid from one or more wells at a drilling location. By automating such dewatering systems, the processing of drilling waste may be adjusted according to changing drilling conditions, such as changes in formation type and fluid flow rates. Exemplary methods of automating and controlling the dewatering system are disclosed in U.S. Patent Provisional Application No. 61/088,298, assigned to the assignee of the present application, and hereby incorporated by reference herein.

Advantageously, embodiments of the aforementioned systems and methods may increase the operating efficiency of water-based drilling fluid dewatering. Because the systems described above may include separate modules to handle dry/liquid flocculants and coagulants, rig downtime that may be experienced during flocculant or coagulant type adjustment may be minimized. Further, because the system may be fully automated through the use of a programmable logic controller, the polymer mixing may be more precise, thus increasing flocculant and coagulant consistency while potentially reducing polymer consumption. Moreover, because a drilling operator no longer has to mix the individual polymers, the operator has more time to attend to other portions of the drilling operation. Furthermore, because the product flocculant and coagulant solutions may be more strictly conditioned, there may occur increased solid separation at higher centrifuge feed rates. The reduction of polymer usage, more efficient use of human labor, and increased solid separation may all contribute to considerable cost reduction in a drilling operation.

Also advantageously, because the process may be a closed loop system, the system may be used to process return drilling fluid in environmentally sensitive areas. As such, the fluid may either be discharged according to local environmental regulations, or reused in the drilling operation, thereby decreasing the cost of bringing new water to the drill site. By decreasing the need for new water, the total cost of the drilling operation may be decreased and environmental regulations regarding the disposal of drilling waste may be met.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method of processing drilling waste, the method comprising:
   providing drilling waste from a primary separation device to a primary separation tank;
   producing a drilling mud from the primary separation tank;
   injecting a polymer into the drilling mud to produce a treated drilling mud;
   directing the treated drilling mud down the inside of a pipe disposed in a clarifying tank, allowing fine particulates to drop out of the treated drilling mud into a settling zone from which a first effluent is drawn, directing the treated drilling mud out of the pipe and up the outside of the pipe from which a second effluent is drawn;
   removing the fine particles from the clarifying tank by directing the first effluent out of the clarifying tank wherein the first effluent comprises the fine particles;
   transferring the first effluent into a first collection tank; and
   transferring the second effluent into a second collection tank.

2. The method of claim 1, wherein the primary separation device comprises a vibratory separator.

3. The method of claim 1, wherein the primary separation tank comprises a sand trap.

4. The method of claim 1, further comprising injecting an acid into the drilling mud.

5. The method of claim 1, further comprising: injecting additional polymer into the treated drilling mud in the clarifying tank.

6. The method of claim 1, further comprising: using a portion of the first or second effluent to dilute the drilling mud.

7. The method of claim 1, wherein the primary separation tank removes coarse particulates from the drilling waste.

8. The method of claim 1, wherein a centrifuge removes fine particulates from the first effluent.

9. The method of claim 1, wherein the treated drilling mud is transferred via turbulent flow to the clarifying tank.

10. The method of claim 1, wherein the first collection tank further comprises at least one separation device.

11. The method of claim 10, wherein the separation device is a skimmer or a hydrocarbon removal device.

12. The method of claim 10 wherein the separation device is a weir device.

13. The method of claim 1, wherein the second collection tank further comprises at least one separation device.

14. The method of claim 1, wherein injecting the polymer into the drilling mud comprises mixing water with a dry polymer to provide the polymer.

* * * * *